United States Patent [19]

Howorth

[11] Patent Number: 4,577,448
[45] Date of Patent: Mar. 25, 1986

[54] FLOORS

[75] Inventor: David Howorth, Bacup, England

[73] Assignee: The British Picker Company, Ltd., Todmorden, England

[21] Appl. No.: 384,743

[22] Filed: Jun. 3, 1982

[30] Foreign Application Priority Data

Jun. 17, 1981 [GB] United Kingdom ............... 8118563

[51] Int. Cl.⁴ .................... E04C 1/30; E04B 1/00; F16B 1/00; E01C 5/20
[52] U.S. Cl. .................... 52/584; 52/127.5; 52/582; 404/40; 403/408.1
[58] Field of Search ............ 52/582, 584, 127.5, 52/127.12, 509, 384, 743, 263; 403/405, 408; 404/40; 272/3, 56.5 SS

[56] References Cited

U.S. PATENT DOCUMENTS

| | | | |
|---|---|---|---|
| 1,888,937 | 11/1932 | Saives | 404/40 |
| 2,341,777 | 2/1944 | Hensel | 52/378 |
| 2,453,221 | 11/1948 | Haden | 52/584 |
| 2,867,301 | 1/1959 | Benton | 52/263 |
| 3,285,633 | 11/1966 | Houvener | 52/584 |
| 3,363,382 | 1/1968 | Forrest | 52/584 |
| 3,778,956 | 12/1973 | Martin | 52/584 |
| 3,903,667 | 9/1975 | Zetlin | 52/263 |
| 3,943,674 | 3/1976 | Ray | 52/584 |
| 4,074,488 | 2/1978 | Ray, III | 52/584 |
| 4,318,637 | 3/1982 | Oger et al. | 52/584 |
| 4,430,837 | 2/1984 | Kirschenbaum | 404/40 |
| 4,435,935 | 3/1984 | Larrea | 52/584 |
| 4,440,818 | 4/1984 | Buchan et al. | 52/582 |
| 4,455,798 | 6/1984 | Tsakiris | 403/405 |

FOREIGN PATENT DOCUMENTS

| | | | |
|---|---|---|---|
| 1509841 | 2/1973 | Fed. Rep. of Germany | 52/127.12 |
| 0191948 | 4/1964 | Sweden | 52/584 |
| 1528447 | 10/1978 | United Kingdom | 272/3 |

Primary Examiner—Donald G. Kelly
Assistant Examiner—Michael Safavi
Attorney, Agent, or Firm—Quaintance, Murphy & Presta

[57] ABSTRACT

A floor, useful for ice or roller skating, including a planar surface made up of a plurality of panels and including locating devices positioned over and under adjacent panels to restrict relative movement between the panels.

9 Claims, 9 Drawing Figures

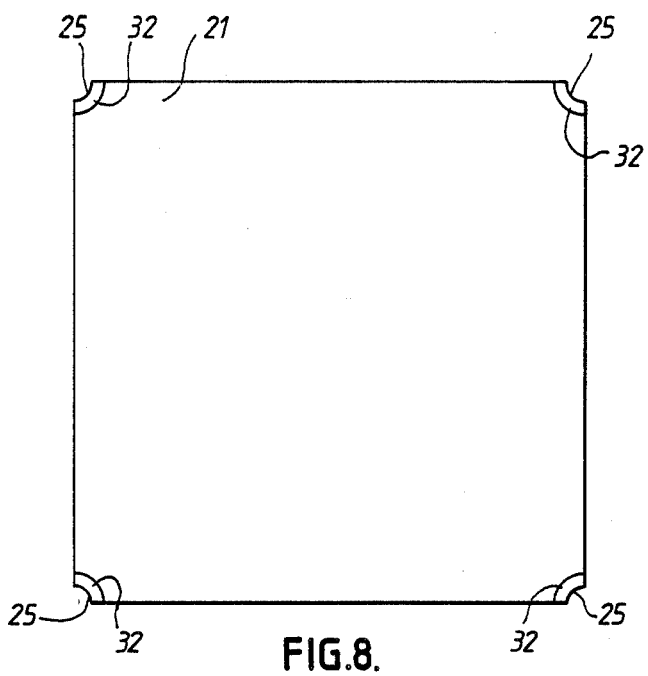
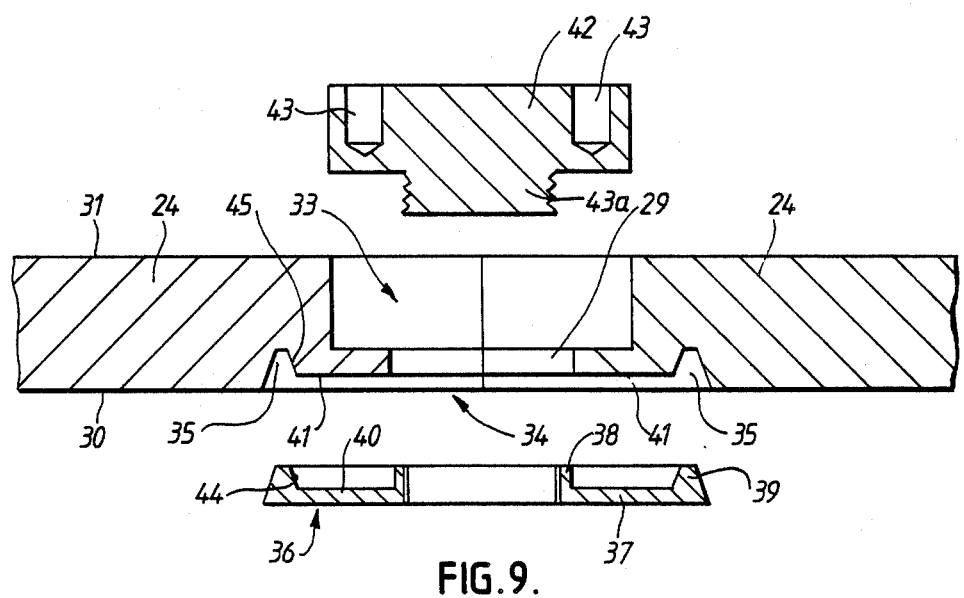

4,577,448

FLOORS

BACKGROUND OF THE INVENTION

The invention relates to floors, for example for use as ice or roller skating floors.

DESCRIPTION OF THE PRIOR ART

Artificial ice or roller skating floors are known which comprise a plurality of plastics components interlocked to provide a smooth flat surface, for example as described in British Patent Specification No. 1526706.

However problems can arise with components such as those shown in British Patent Specification No. 1526706. The components are difficult to machine but quite apart from that, although they are locked together in the horizontal plane, each component is not restricted against vertical movement. There is thus a risk, particularly when the floor is laid on a surface which is not absolutely flat, that one or more components may work their way upwardly slightly, or tilt slightly, thus creating a slight shoulder between adjacent components, which could catch on or impede a users skate.

Other techniques are known for fitting components together in an attempt to prevent this rising effect but these involve the use of clips or keying members which make replacement of part of a floor difficult or impossible.

OBJECT OF THE INVENTION

It is the object of the invention to provide an artificial skating floor comprising a plurality of panels which are restricted against relative vertical movement and which are readily replaceable in the event of damage or wear.

SUMMARY OF THE INVENTION

The invention provides a floor for use as an ice or roller skating floor, comprising a plurality of panels arrangeable to provide a substantially continuous planar surface, and a plurality of locating devices arrangeable between each pair of adjacent panels, each locating device having a portion which overlies the adjacent parts of the two panels of the pair, in such a manner as to restrict upward movement of one panel with respect to the other panel.

Preferably the locating device also has a portion which underlies adjacent parts of the two panels, so that the adjacent edges of the two panels are sandwiched between the two portions of the locating device.

Preferably the locating device hooks over a part of each of the two panels so that the two panels are prevented from moving apart in the horizontal direction.

The locating device preferably comprises upper and lower portions which are threadedly connectable together to sandwich the panels therebetween.

One of the parts may have a tapered interengagement with the panels so that as the parts are threaded together to sandwich the panels therebetween, adjacent panels are urged towards one another.

The upper portion may have a female screw thread, the lower portion having a male screw thread, the male screw thread being accessible through the upper portion so that both the portions can be gripped from above the floor for screwing the portions together.

The locating device may be arranged to hook over the panels by virtue of a flange on one of the portions which seats in a groove provided in the panels.

Preferably the panels are manufactured from high molecular weight polyethylene. The upper portion of the locating device is also preferably manufactured from this material. The lower portion of the locating device may be manufactured from this material or from some other material such as metal.

The thickness of the floor may be in the range 15 mm to 25 mm, for example 20 mm.

Other objects and preferred features of the invention will become apparent from the following description of various embodiments of the invention, given by way of example.

BRIEF DESCRIPTION OF THE DRAWINGS

FIG. 8 is a plan view of one panel of a still further embodiment of the invention; and FIG. 9 is an exploded cross-sectional view of a joint between adjacent panels of the still further embodiment.

FIG. 1 shows a plurality of substantially square panels arranged in a staggered formation to provide a substantially continuous floor. The panels are made of high molecular weight polyethylene which provides a surface which has been found to be effective as a substitute for ice when ice skating.

Each edge of each panel is machined at two locations 11 to provide a circular cross-section (when viewed in plan view) locating device 12. As will be explained in more detail below, each locating device fastens together the mating edges of each pair of adjacent panels, both in the upward direction and the horizontal direction, thus providing a firm secure floor with minimal risk of any one panel riding up and providing an obstruction to a skater.

Figure 4:
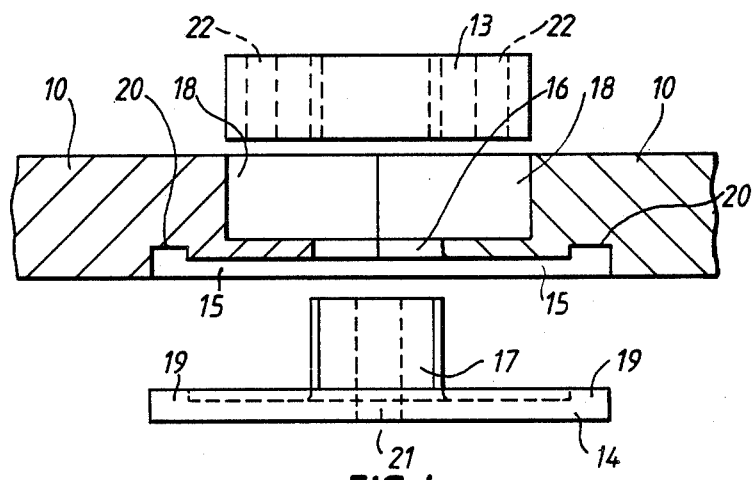
FIG. 4 is a view similar to FIG. 3 but showing the locating device in exploded view.

As best shown in FIG. 4, each locating device 12 comprises an upper portion in the form of a nut 13 and a lower portion in the form of a bolt 14. The underside of the panels 10 are machined away at 15 to receive the head of the bolt. There is an aperture 16 through which the shank 17 of the bolt can pass, and the upper face of the panels 10 is machined away at 18 to receive the nut 13. Each of the panels 10 has sufficient space to accommodate half of the bolt and half of the nut, so that when the panels are fitted together as shown in FIG. 1, the panels combine to form spaces each of which can accommodate a whole bolt and a whole nut.

Each bolt 14 has an upwardly extending peripheral flange 19 and each panel is provided with an arcuate groove 20 into which this flange 19 can hook.

Each bolt is provided with a square section bore 21 and each nut 13 is provided with a pair of holes 22.

Figure 1:
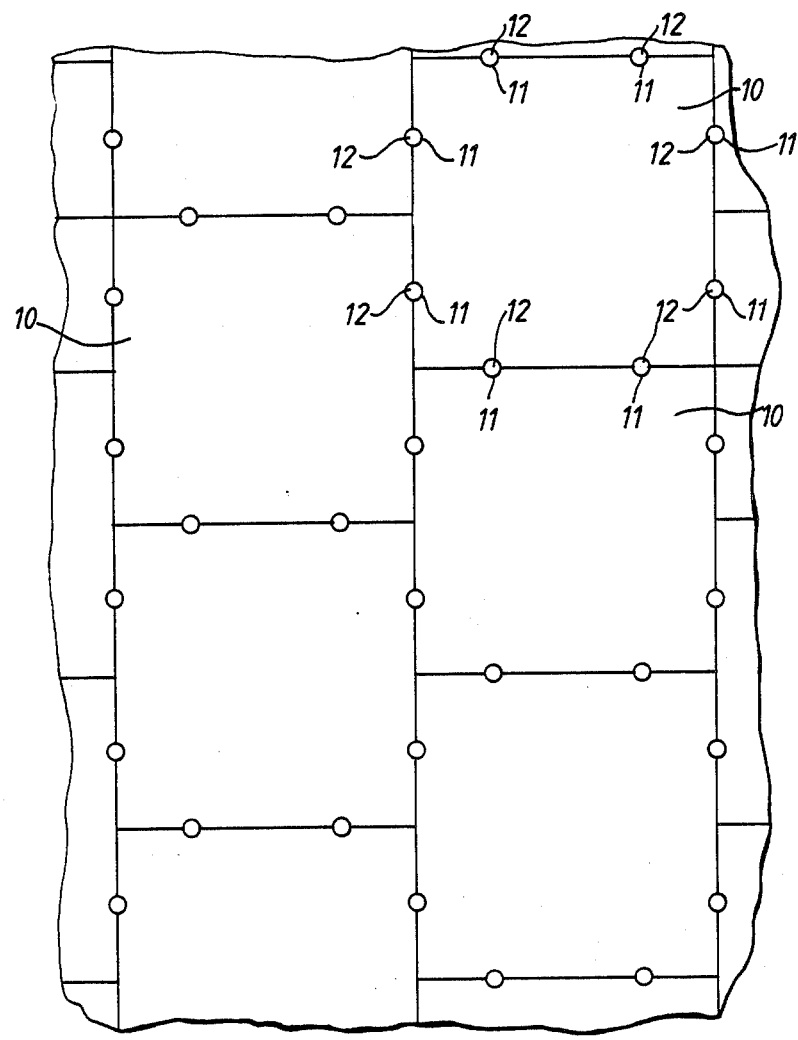
FIG. 1 is a plan view of an embodiment of floor according to the invention.

To assemble the floor, the panels are laid out as shown in FIG. 1, a bolt 14 being positioned underneath each of the locations 11. This can be done very rapidly, the bolts fitting neatly into position with their flanges 19 engaging in the grooves 20. The bolts can then be held against rotation from above the floor by inserting an appropriate key into the bore 21, and each bolt can have a nut 13 screwed on to it by inserting an appropriate key, for example a C-shaped spanner having pegs that project into the holes 22.

Figure 3:
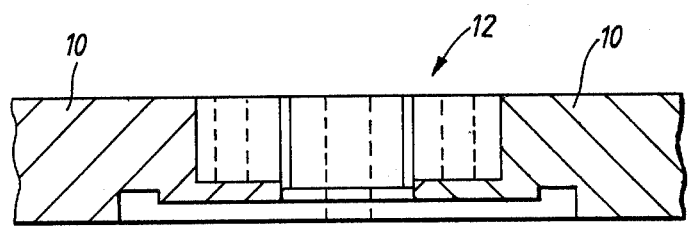
FIG. 3 is a cross-section on line III—III of FIG. 2.
Figure 2:
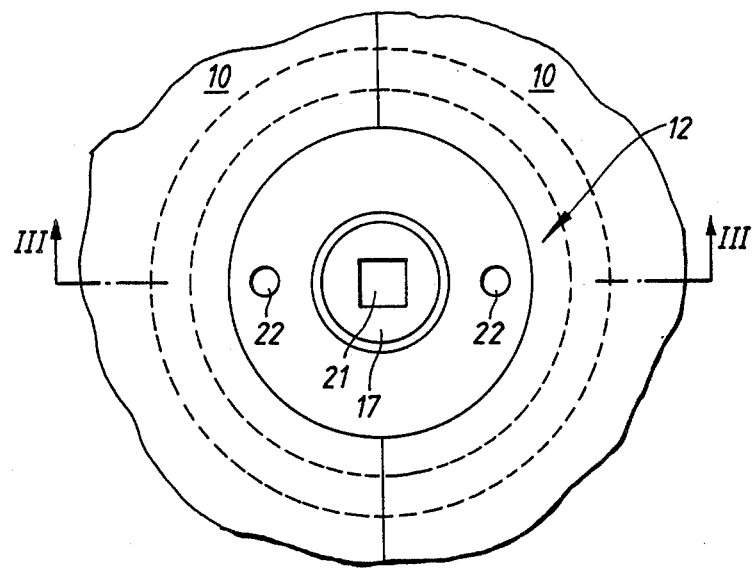
FIG. 2 is a plan view to a larger scale of part of the floor shown in FIG. 1, showing one of the locating devices in more detail.

Once each nut is screwed tightly down on to the associated bolt, the locating device is as shown in FIG. 3. The upper face of the nut, together with the upper end of the shank of the bolt, combine with the panels 10 to provide a smooth continuous surface. Since each nut overlies part of each pair of adjacent panels, each edge of each panel is prevented from rising with respect to the adjacent panel. Furthermore, because the flanges 19 hook into the grooves 20, the panels are also prevented from moving with respect to one another in the horizontal direction.

If any one panel or group of panels becomes worn or damaged, it can rapidly be replaced by undoing the necessary nuts, removing the old panel or panels, inserting a new panel or panels, and replacing the nuts.

Figure 5:
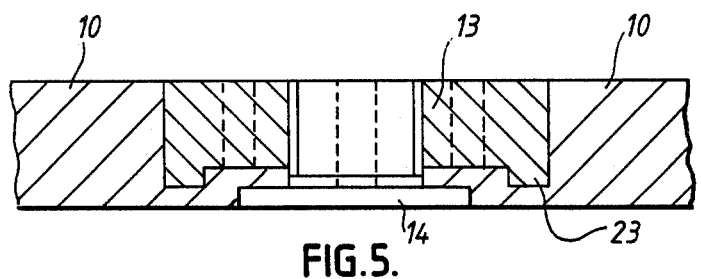
FIG. 5 is a view similar to FIG. 3 but showing an alternative embodiment of locating device.

FIG. 5 illustrates an embodiment which is generally similar, except for the fact that the head of the bolt 14 is smaller, the nut 13 is larger, and instead of providing a flange 19 on the head of the bolt, a flange 23 is provided on the nut.

Figure 6:
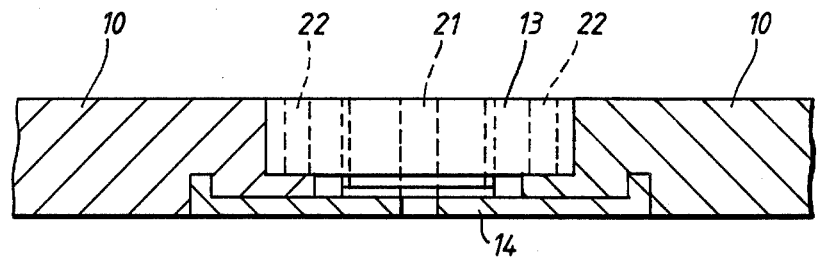
FIGS. 6 and 7 are views similar to FIGS. 3 and 4 showing yet another embodiment according to the invention.
Figure 7:
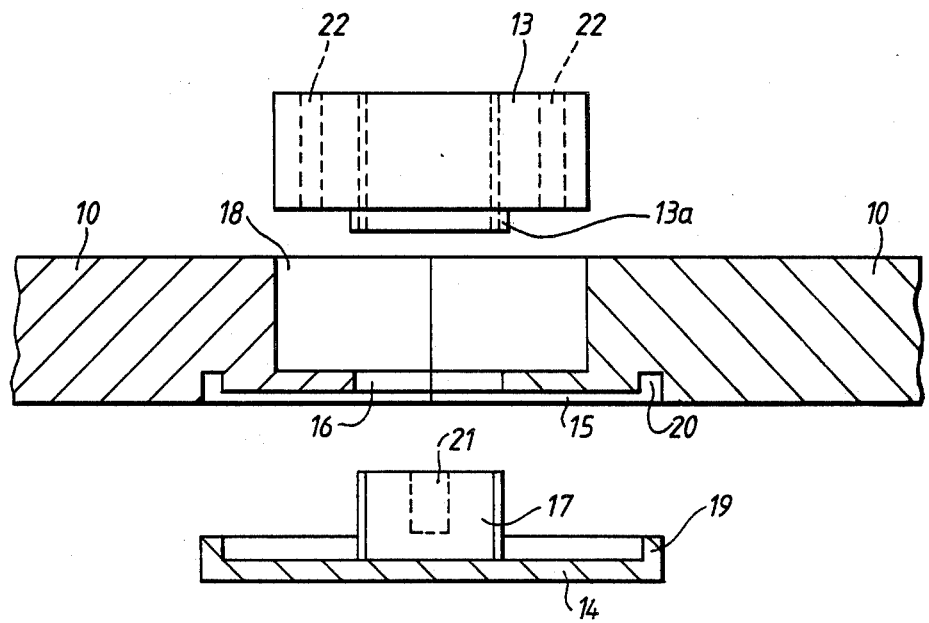

FIGS. 6 and 7 show an embodiment generally similar to that shown in FIGS. 1 to 4, except that the nut 13 has a downwardly projecting boss 13a thereon. The hole 16 and bolt shank 17 are of such a size that the shank 17 can pass through the hole 16 with clearance around the shank. When the nut is tightened, this clearance is filled by the boss 13a, as best illustrated in FIG. 6.

Turning now to the embodiment shown in FIGS. 8 and 9, this embodiment also utilises substantially square panels of high molecular weight polyethylene, one panel 24 being shown in plan view in FIG. 8 and two panels 24 being shown joined together in FIG. 9.

As best shown in FIG. 8, notches 25 are provided in the edges of the panels, at the corners of the panels, and when panels are assembled together as shown in FIG. 9 the notches co-operate to define a plurality of bores, one of which is shown centrally in FIG. 9, the bores extending vertically through the skating surface from the lower face 30 of the skating surface to the upper face 31.

Again as best seen in FIG. 8, an upper rebate 32 is provided around each notch and when the panels are assembled these rebates co-operate to define an upper counterbore 33 (see FIG. 9) at the upper end of each bore 29.

In addition there is a rebate in the lower face of each panel, again surrounding each notch 25, these rebates co-operating to define a lower counterbore 34 at the lower end of each bore 29. The counterbore 34 has a greater diameter than the counterbore 33 but is much lower in height, as clearly shown in FIG. 9.

Surrounding each lower rebate in the lower face of each panel is an arcuate groove 35 so that when the panels are assembled the grooves 35 co-operate to define a circular groove extending around the periphery of the lower counterbore 34.

As the panels are assembled together as shown in FIG. 9, a first locating member 36 is positioned in each lower counterbore 34. Each member 36 comprises a disc-like plate 37 from which projects an internally screw-threaded boss 38 and a peripheral flange 39. The boss 38 projects into the bore 29 and the flange 39 mates with the grooves 35. The upper face 40 of the plate is knurled or otherwise roughened to increase friction with the surface 41 of the panels and reduce any tendency for the member 36 to rotate.

There is also a second locating member in the form of a cylindrical plug 42 having an externally threaded boss 43a which is screwed into the internally threaded boss 38 of the lower member 36. The plug 42 can be rotated with an appropriate tool engaging in two sockets 43 in the upper face of the plug, the lower member 36 being held against rotation because of the frictional engagement between the surfaces 40 and 41.

The two locating members securely sandwich between them the corners of four panels, so that none of the corners can lift with respect to any of the other corners. In addition the panels are held together against movement in the horizontal direction by engagement of the flanges 39 in the grooves 35.

The flanges 39 and grooves 35 have tapered co-operating surfaces 44 and 45 so that any gaps between the edges of the panels tend to be closed since the panels are drawn together in the horizontal direction as the flanges 39 move into the grooves 35.

The invention is not restricted to the details of the foregoing embodiments. For example in some circumstances it may be possible for the bolts, and/or the nuts, to be manufactured wholly or partly from metal.

Although substantially square panels are illustrated, the panels may have other configurations. They may for example be rectangular, and a preferred size has the dimensions 1.2 meters ×0.6 meters. A panel of such dimensions may for example be held in position by a total of ten locating devices, there being four on each of the two long sides of the panel and two on each of the two short sides of the panel.

I claim:

1. An artificial ice skating floor comprising:
   (a) a plurality of panels of high molecular weight polyethylene arranged edge to edge to provide a substantially continuous planar skating surface;
   (b) notches in the edges of the panels which co-operate with the notches in the edges of adjacent panels to define a plurality of bores extending vertically through the skating surface from the lower face of the skating surface to the upper face of the skating surface;
   (c) a set of first rebates in the upper faces of the panels around the said notches, and said first rebates of the panels co-operating with the said first rebates of adjacent panels so that an upper counterbore is defined around the upper end of each said bore;
   (d) a set of second rebates in the lower faces of the panels around the said notches, the said second rebates of the panels co-operating with the said second rebates of adjacent panels so that a lower counterbore is defined around the lower end of each said bore;
   (e) a set of grooves in the lower faces of the panels;
   (f) a set of flanged first locating members each of which engages in one of the said lower counterbores with the flanged portion of the first locating member engaging in the groove of the adjacent panels which define the said one lower counterbore thus preventing the panels from moving apart in the horizontal direction;
   (g) and a set of second locating members each of which engages in one of the said upper counterbores and is screw-threadedly interconnected with one of said first locating members through the said bore associated with the said upper counterbore, sandwiching the panels between the first and second locating members so that the panels cannot move apart in the vertical direction.

2. A floor for use as an ice or roller skating floor, comprising a plurality of panels arrangeable to provide an substantially continuous planar surface, and a plurality of locating devices arrangeable between each pair of adjacent panels, each locating device comprising an upper portion and a lower portion, the two portions being releasably connectable, and each locating device having a portion which overlies the adjacent parts of the two panels of the pair, in such a manner as to restrict upper movement of one panel with respect to the other panel, the locating device lower portion which underlies adjacent parts of the two panels being positioned and configured so that the adjacent edges of the two panels are sandwiched between the two portions of the locating device, the upper and lower portions being threadedly connectable together to sandwich the panels there between, the peripheral edges of each upper portion being flush with the edges of the panels adjacent thereto, each lower portion extending upwardly through the center of its associated upper portion, said upper and lower portions having upper surfaces substantially coplanar with each other and the upper surfaces of the adjacent panels associated therewith.

3. A floor as claimed in claim 2, in which the locating device hooks over a part of each of the two panels so that the two panels are prevented from moving apart in the horizontal direction.

4. A floor as claimed in claim 3, in which the locating device is arranged to hook over the panels by virtue of a flange on one of the portions which seats in a groove provided in the panels.

5. A floor as claimed in claim 2, in which one of the portions has a tapered interengagement with the panels so that as the portions are threaded together to sandwich the panels therebetween adjacent panels are urged towards one another.

6. A floor as claimed in claim 2, in which the panels are manufactured from high molecular weight polyethylene.

7. A floor as claimed in claim 2, in which the panels have a thickness in the range 15 mm to 25 mm.

8. A floor as claimed in claim 2, in which the upper surface of each upper portion has first tool receiving means defined substantially centrally therewithin and its associated lower portion has second tool receiving means defined therein whereby upon opposite relative rotation of associated upper and lower portions as by tools engaging the respective tool receiving means, the associated upper and lower portions many be threaded together, thus to sandwich a pair of adjacent panels therebetween.

9. An artificial ice skating floor comprising:
 (a) a plurality of panels of high molecular weight polyethylene arranged edge to edge to provide a substantially continuous planar skating surface;
 (b) notches in the edges of the panels which co-operate with the notches in the edges of adjacent panels to define a plurality of bores extending vertically through the skating surface from the lower face of the skating surfaces to the upper face of the skating surface;
 (c) a set of first rebates in the upper faces of the panels around the said notches, the said first rebates of the panels co-operating with the said first rebates of adjacent panels so that an upper counterbore is defined around the upper end of each said bore;
 (d) a set of second rebates in the lower faces of the panels around the said notches, the said second rebates of the panels co-operating with the said second rebates of adjacent panels so that a lower counterbore is defined around the lower end of each said bore;
 (e) a set of grooves in the lower faces of the panels;
 (f) a set of flanged first locating members each of which engages in one of the said lower counterbores with the flanged portion of the first locating member engaging in the groove of the adjacent panels which define the said one lower counterbore thus preventing the panels from moving apart in the horizontal direction;
 (g) and a set of second locating members each of which engages in one of the said upper counterbores and is screw-threadedly interconnected with one of said first locating members through the said bore associated with the upper counterbore, sandwiching the panels between the first and second locating members so that the panels cannot move apart in the vertical direction, said grooves and flanges being tapered so that as the first and second locating members are screwed together the edges of the panels are urged toward one another.

* * * * *